(12) United States Patent
Krishnan et al.

(10) Patent No.: US 10,953,809 B2
(45) Date of Patent: Mar. 23, 2021

(54) SENSOR ASSEMBLY WITH AIRFLOW CONTROL

(71) Applicant: Ford Global Technologies, LLC, Dearborn, MI (US)

(72) Inventors: Venkatesh Krishnan, Canton, MI (US); Rashaun Phinisee, Ypsilanti, MI (US); Mark Bosca, St Clair Shores, MI (US); Raghuraman Surineedi, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 172 days.

(21) Appl. No.: 16/448,198

(22) Filed: Jun. 21, 2019

(65) Prior Publication Data
US 2020/0398765 A1 Dec. 24, 2020

(51) Int. Cl.
*B60R 11/00* (2006.01)
*G05D 1/00* (2006.01)

(52) U.S. Cl.
CPC ............ *B60R 11/00* (2013.01); *G05D 1/0088* (2013.01); *B60R 2011/004* (2013.01); *B60R 2011/005* (2013.01); *G05D 2201/02* (2013.01)

(58) Field of Classification Search
CPC ............... B60R 11/00; B60R 2011/005; B60R 2011/004; G05D 1/0088; G05D 2201/02
See application file for complete search history.

(56) References Cited

U.S. PATENT DOCUMENTS

| | | |
|---|---|---|
| 7,147,269 B2 | 12/2006 | Aase et al. |
| 8,514,660 B2 | 8/2013 | Roussel et al. |
| 8,572,895 B2 | 11/2013 | Kollar et al. |
| 8,864,392 B2 | 10/2014 | Alexander et al. |
| 9,919,748 B2 | 3/2018 | Williams et al. |

*Primary Examiner* — D Glenn Dayoan
*Assistant Examiner* — Melissa Ann Bonifazi
(74) *Attorney, Agent, or Firm* — Frank A. MacKenzie; Bejin Bieneman PLC (57) ABSTRACT

A sensor assembly for a vehicle includes a vehicle sensor, a shield panel that is positioned upstream of the vehicle sensor and that is pivotable, and a computer communicatively coupled to the shield panel. The computer is programmed to pivot the shield panel based on data representing a wind speed.

16 Claims, 7 Drawing Sheets

SENSOR ASSEMBLY WITH AIRFLOW CONTROL

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

A sensor assembly includes a vehicle sensor, a shield panel that is positioned upstream of the vehicle sensor and that is pivotable, and a computer communicatively coupled to the shield panel. The computer is programmed to pivot the shield panel based on data representing a wind speed.

The sensor assembly may further include a side panel positioned adjacent the shield panel and extending upward. The side panel may be stationary.

The side panel may be a first side panel, and the sensor assembly may further include a second side panel positioned adjacent the shield panel on an opposite side as the first side panel and extending upward.

The shield panel may include a shield-panel edge, the side panel may include a side-panel edge, and the shield panel may be pivotable to a raised position in which the shield-panel edge is aligned with the side-panel edge. The side panel may extend in a downstream direction from the side-panel edge.

The side panel may be a first side panel, the side-panel edge may be a first side-panel edge, the shield-panel edge may be a first shield-panel edge, the sensor assembly may further include a second side panel positioned adjacent the shield panel on an opposite side as the first side panel and extending upward, the shield panel may include a second shield-panel edge, the second side panel may include a second side-panel edge, and when the shield panel is in the raised position, the second shield-panel edge may be aligned with the second side-panel edge. The first side panel may extend in a downstream direction from the first side-panel edge, and the second side panel may extend in a downstream direction from the second side-panel edge.

The sensor assembly may further include a housing, the vehicle sensor may protrude upward from the housing, and the shield panel may be mounted to the housing. The housing may be shaped to conform to a vehicle roof.

The shield panel may include a panel portion and a pivoting portion, and the pivoting portion may be a shape-memory material. The computer may pivot the shield panel by controlling electrical voltage supplied to the pivoting portion.

The sensor assembly may further include an anemometer fixed relative to the vehicle sensor and communicatively coupled to the computer.

The computer may be programmed to pivot the shield panel to a raised position in response to a wind speed greater than a threshold.

The computer may be programmed to pivot the shield panel to a lowered position in response to a vehicle on which the vehicle sensor is mounted being stationary.

The shield panel may be pivotable between a lowered position and a raised position, and the vehicle sensor extends higher than the shield panel in the raised position.

A sensor assembly 32 for a vehicle 30 includes a vehicle sensor 34, a shield panel 36 that is positioned upstream of the vehicle sensor 34 and that is pivotable, and a computer 38 communicatively coupled to the shield panel 36. The computer 38 is programmed to pivot the shield panel 36 based on data representing a wind speed.

The shield panel 36 can provide protection for the vehicle sensor 34 when such protection is useful and can retract when not beneficial. For example, the shield panel 36 can reduce the drag caused by the vehicle sensor 34, and the shield panel 36 can reduce the quantity of water droplets or debris such as insects, etc. striking the vehicle sensor 34.

Figure 1:
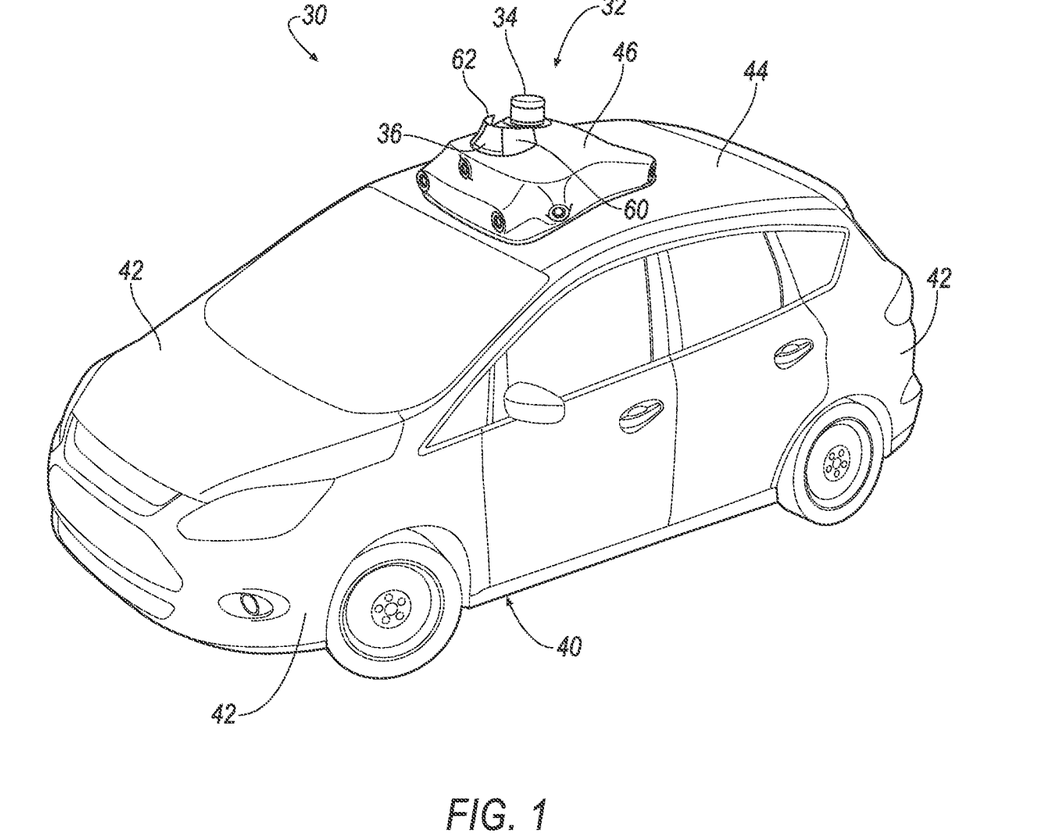
FIG. 1 is a perspective view of an example vehicle with a sensor assembly.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A vehicle computer can be programmed to operate the vehicle 30 independently of the intervention of a human driver, completely or to a lesser degree. The vehicle computer may be programmed to operate propulsion, brake system, steering, and/or other vehicle systems based at least in part on data received from sensors such as the vehicle sensor 34 described below. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 30 includes a body 40. The vehicle 30 may be of a unibody construction, in which a frame and the body 40 of the vehicle 30 are a single component. The vehicle 30 may, alternatively, be of a body-on-frame construction, in which the frame supports the body 40 that is a separate component from the frame. The frame and body 40 may be formed of any suitable material, for example, steel, aluminum, etc.

The body 40 includes body panels 42, 44 partially defining an exterior of the vehicle 30. The body panels 42, 44 may present a class-A surface, e.g., a finished surface exposed to view by a customer and free of unaesthetic blemishes and defects. The body panels 42, 44 include, e.g., a roof 44, etc.

Figure 2:
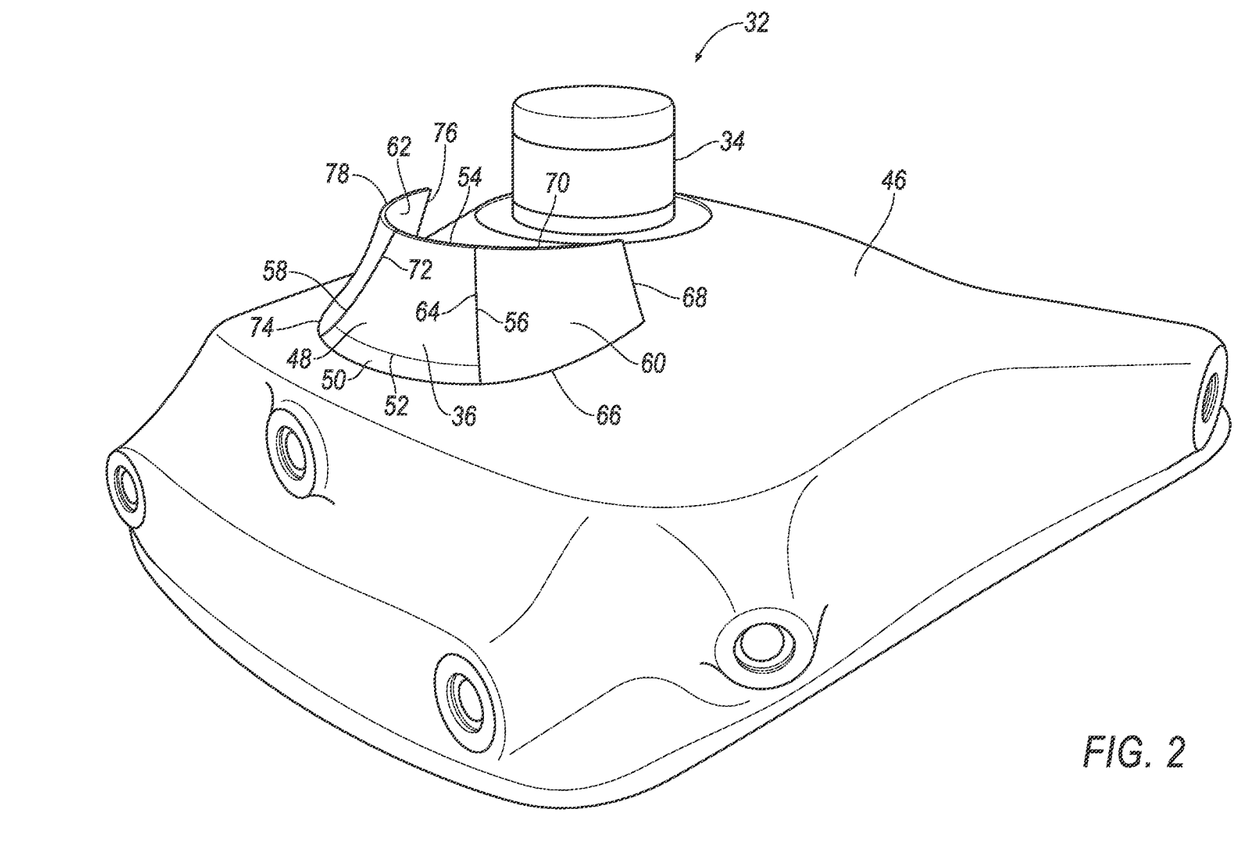
FIG. 2 is a perspective view of a housing of the vehicle with the sensor assembly.
Figure 3:
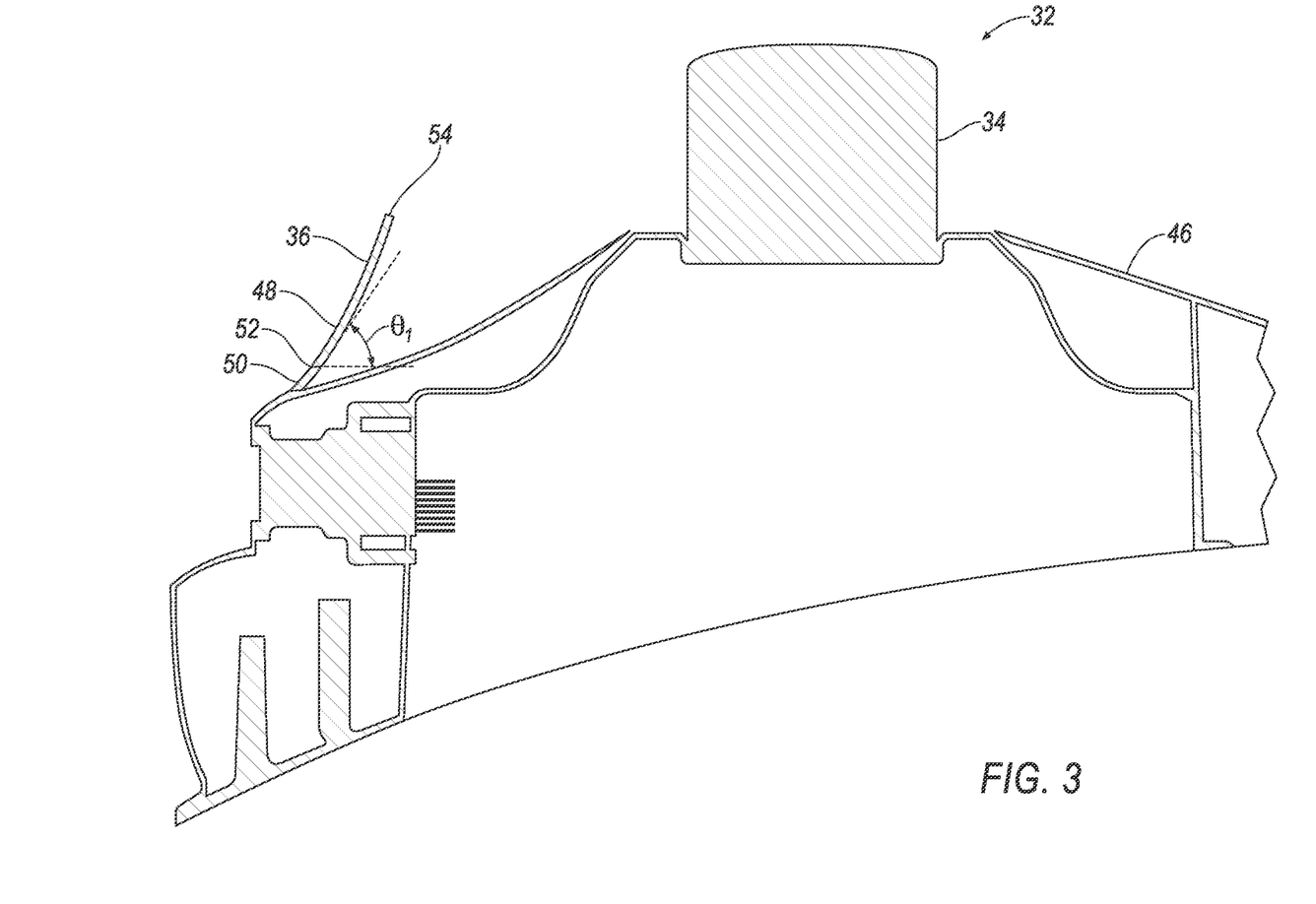
FIG. 3 is side cross-sectional view of the housing with the sensor assembly.
Figure 4:
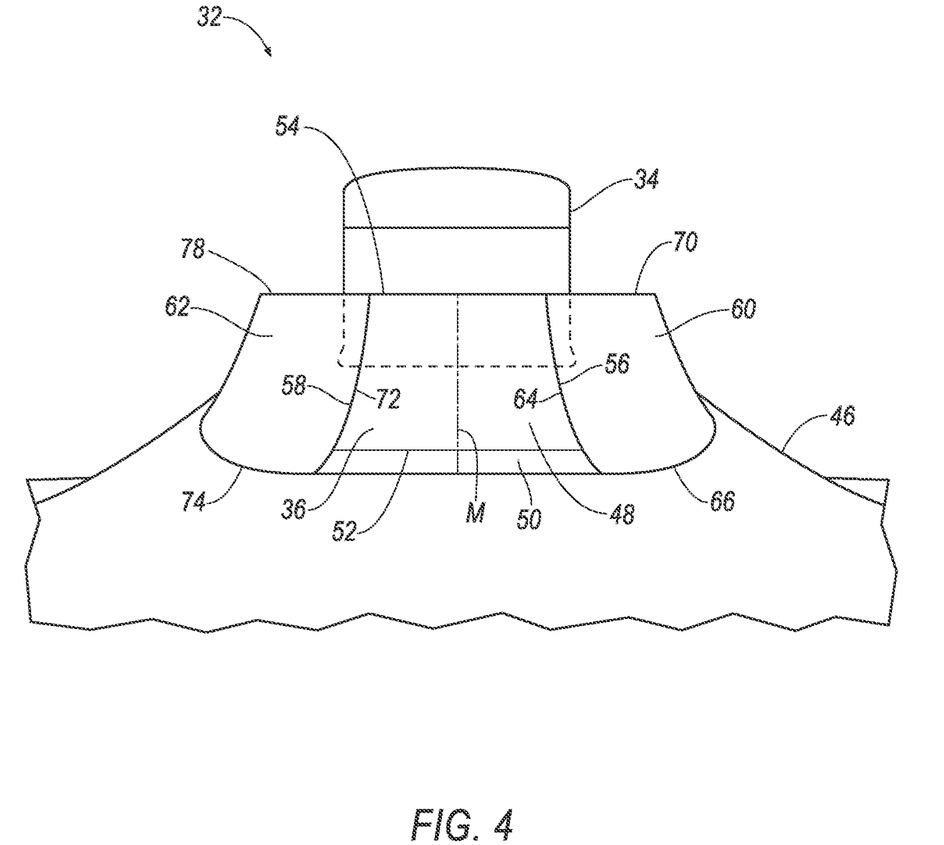
FIG. 4 is a front view of the housing with the sensor assembly.

With reference to FIGS. 2-4, a housing 46 for sensors including the vehicle sensor 34 is attachable to the vehicle 30, e.g., to one of the body panels 42, 44 of the vehicle 30, e.g., the roof 44. For example, the housing 46 may be shaped to conform to the roof 44, e.g., may have a shape matching a contour of the roof 44. The housing 46 may be attached to the roof 44, which can provide the sensors with an unobstructed field of view of an area around the vehicle 30. The housing 46 may be formed of, e.g., plastic or metal.

The vehicle sensor 34 is supported by and mounted to the housing 46. The vehicle sensor 34 is disposed on top of the housing 46, e.g., at a highest point of the housing 46. The vehicle sensor 34 is exterior to the housing 46 and protrudes upward from the housing 46. The vehicle sensor 34 is positioned laterally, i.e., along a left-right dimension relative to the vehicle 30, in a middle of the vehicle 30. The vehicle sensor 34 has a cylindrical shape defining an axis that is oriented substantially vertically.

The vehicle sensor 34 is provided to detect features of the outside world; for example, the vehicle sensor 34 can be a radar sensor, a scanning laser range finder, a light detection and ranging (LIDAR) device, or an image processing sensor such as a camera. In particular, the vehicle sensor 34 may be a LIDAR device, e.g., a scanning LIDAR device. A LIDAR device detects distances to objects by emitting laser pulses at a particular wavelength and measuring the time of flight for the pulse to travel to the object and back.

The shield panel 36 is supported by and mounted to the housing 46. The shield panel 36 is disposed on top of the housing 46. The shield panel 36 is exterior to the housing 46. The shield panel 36 is positioned laterally in a middle of the vehicle 30. The shield panel 36 is positioned upstream of the vehicle sensor 34, e.g., directly upstream. For the purposes of this disclosure, "upstream" is defined as a direction against the flow of wind past the vehicle 30 while the vehicle 30 travels straight forward with no ambient wind, and "downstream" is defined as a direction with the flow of wind past the vehicle 30 while the vehicle 30 travels straight forward with no ambient wind.

Figure 5A:
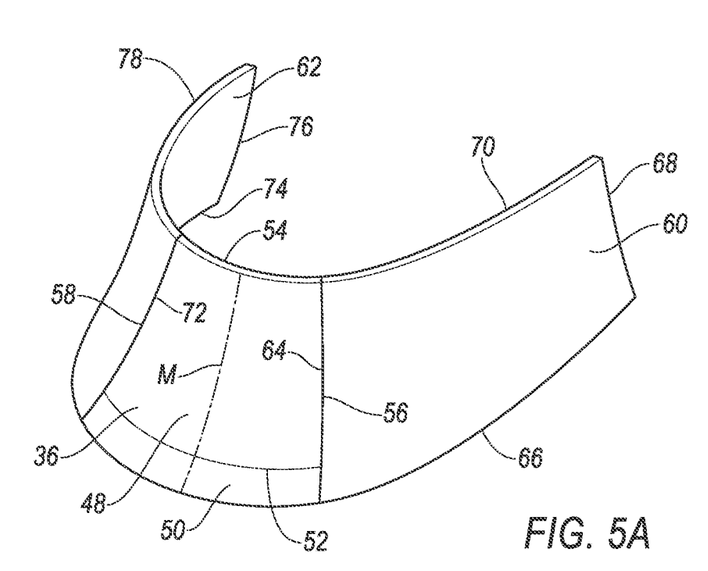
FIG. 5A is a perspective view of a shield panel and side panels of the sensor assembly, with the shield panel in a raised position.
Figure 5B:
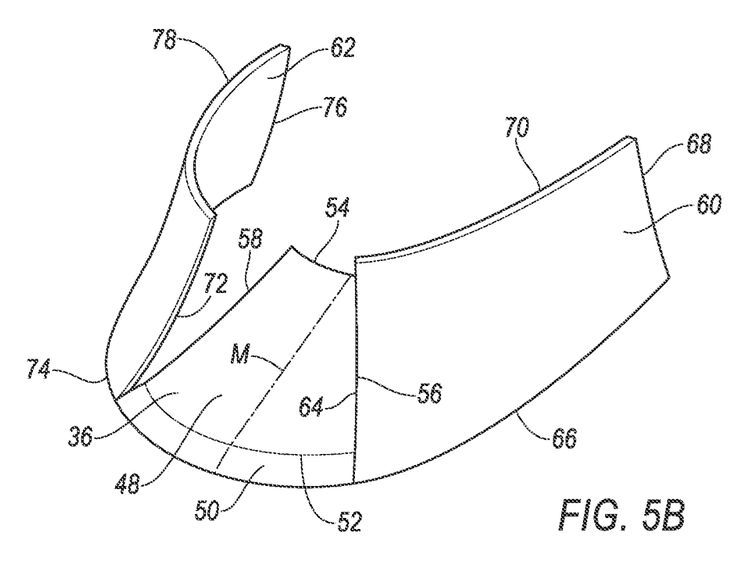
FIG. 5B is a perspective view of the shield panel and side panels of the sensor assembly, with the shield panel in a lowered position.

With reference to FIGS. 5A-B, the shield panel 36 includes a panel portion 48 and a pivoting portion 50. The panel portion 48 is attached to the pivoting portion 50, and the pivoting portion 50 is attached to the housing 46. The panel portion 48 is only attached to the housing 46 via the pivoting portion 50. The panel portion 48 is cantilevered from the pivoting portion 50, i.e., extending from one end supported by the pivoting portion 50 and otherwise unsupported. The panel portion 48 extends from a base edge 52 attached to the pivoting portion 50 to an upper edge 54 spaced from the pivoting portion 50, and the panel portion 48 extends from a first shield-panel edge 56 to a second shield-panel edge 58. The shield-panel edges 56, 58 extend from the base edge 52 to the upper edge 54. The panel portion 48 has a curved rectangular shape that is symmetrical about a midline M from the base edge 52 to the upper edge 54. The midline M extends from a point halfway between the first shield-panel edge 56 and the second shield-panel edge 58 on the base edge 52 to a point halfway between the first shield-panel edge 56 and the second shield-panel edge 58 on the upper edge 54. The panel portion 48 is rigid, i.e., maintains its shape and has no moving parts.

The pivoting portion 50 extends upwardly from the housing 46. The pivoting portion 50 extends from the housing 46 to the base edge 52 of the panel portion 48 and from the first shield-panel edge 56 to the second shield-panel edge 58.

The pivoting portion 50 is a shape-memory material, e.g., a shape-memory alloy or shape-memory polymer. A shape-memory material is reversibly deformable under the application of electricity or heat. For example, the shape-memory material can be deformable based on a voltage difference applied across the pivoting portion 50. The pivoting portion 50 can be bimodally deformable between a first shape and a second shape. For the purposes of this disclosure, "bimodally deformable" means that each of two shapes is stable until the electricity or heat is adjusted so that the pivoting portion 50 switches to the other shape. For example, applying a first voltage causes the pivoting portion 50 to conform to and stay at the first shape, applying a second voltage causes the pivoting portion 50 to conform to and stay at the second shape, and applying a voltage between the first and second voltages causes the pivoting portion to move or stay at either the first shape or the second shape depending on whether the voltage is above or below a transition voltage. Alternatively, the pivoting portion 50 can be continuously deformable from the first shape to the second shape. For the purposes of this disclosure, "continuously deformable" means that stable shapes between the first and second shapes are possible depending on the quantity of electricity or heat applied to the pivoting portion 50. For example, applying the first voltage causes the pivoting portion 50 to conform to and stay at the first shape, applying the second voltage causes the pivoting portion 50 to conform to and stay at the second shape, and applying a voltage between the first and second voltages causes the pivoting portion 50 to conform to and stay at a shape between the first and second shapes.

The shield panel 36 is pivotable between a lowered position, as shown in FIG. 5B, and a raised position, as shown in FIG. 5A. Specifically, when the pivoting portion 50 is in the first shape, the shield panel 36 is in the lowered position, and when the pivoting portion 50 is in the second shape, the shield panel 36 is in the raised position. If the pivoting portion 50 is continuously deformable, then the shield panel 36 can be pivoted to positions between the lowered and raised positions. When the shield panel 36 is in the lowered position, a tangent line to the midline M at the base edge 52 forms an acute angle $\theta_1$ with a horizontal rearward line, and when the shield panel 36 is in the raised position, the tangent line to the midline M at the base edge 52 forms an acute angle $\theta_2$ with a horizontal rearward line. The angle $\theta_2$ is greater than the angle $\theta_1$. For example, the angle $\theta_1$ can be approximately 10°, and the angle $\theta_2$ can be approximately 45°.

A first side panel 60 is positioned adjacent the shield panel 36, and a second side panel 62 is positioned adjacent the shield panel 36 on an opposite side as the first side panel 60. The side panels 60, 62 are lateral of the shield panel 36; i.e., one of the side panels 60, 62 is to the left of the shield panel 36, and the other of the side panels 60, 62 is to the right of the shield panel 36. The side panels 60, 62 are symmetrical to each other about the midline M of the shield panel 36. The side panels 60, 62 are supported by and mounted to the housing 46. The side panels 60, 62 are disposed on top of the housing 46. The side panels 60, 62 are exterior to the housing 46. The side panels 60, 62 extend upward from the housing 46. The side panels 60, 62 are stationary and rigid.

The side panels 60, 62 each have a curved quadrilateral shape. The first side panel 60 includes a first side-panel edge 64, a first side-panel base edge 66, a first side-panel downstream edge 68, and a first side-panel upper edge 70. The first side panel 60 extends in a downstream direction from the first side-panel edge 64 to the first side-panel downstream edge 68, which is spaced from the first side-panel edge 64. The first side-panel edge 64 and the first side-panel downstream edge 68 extend from the first side-panel base edge 66 to the first side-panel upper edge 70, and the first side-panel base edge 66 and first side-panel upper edge 70 extend from the first side-panel edge 64 to the first side-panel downstream edge 68. The first side panel 60 is connected to the housing 46 along the first side-panel base edge 66. The second side panel 62 includes a second side-panel edge 72, a second side-panel base edge 74, a second side-panel downstream edge 76, and a second side-panel upper edge 78. The second side panel 62 extends in a downstream direction from the second side-panel edge 72 to the second side-panel downstream edge 76, which is spaced from the second side-panel edge 72. The second side-panel edge 72 and the second side-panel downstream edge 76 extend from the second side-panel base edge 74 to the second side-panel upper edge 78, and the second side-panel base edge 74 and second side-panel upper edge 78 extend from the second side-panel edge 72 to the second side-panel downstream edge 76. The second side panel 62 is connected to the housing 46 along the second side-panel base edge 74.

When the shield panel 36 is in the raised position, the first shield-panel edge 56 is aligned with the first side-panel edge 64, and the second shield-panel edge 58 is aligned with the second side-panel edge 72. When the shield panel 36 is in the raised position, the shield panel 36 forms a continuous surface with the first side panel 60 and with the second side panel 62, with respect to wind flow. For the purposes of this disclosure, "continuous surface with respect to wind flow" means that the surface does not introduce any nonnegligible turbulence or discontinuity into the wind flow. Thus, when the shield panel 36 is in the raised position, any gap between the shield panel 36 and the first side panel 60 or second side panel 62 does not cause turbulence. When the shield panel 36 is in the raised position, the first side-panel upper edge 70, the upper edge 54, and the second side-panel upper edge 78 form a substantially continuous curve.

The base edge 52 of the pivoting portion 50 of the shield panel 36 is vertically below the bottom of the vehicle sensor 34, as seen in FIGS. 3 and 4. When the shield panel 36 is in the raised position, the upper edge 54 is above the bottom of the vehicle sensor 34 and below the top of the vehicle sensor 34; i.e., the vehicle sensor 34 extends higher than the shield panel 36 in the raised position. When the shield panel 36 is in the lowered position, the upper edge 54 is below the bottom of the vehicle sensor 34. When the shield panel 36 is in the lowered position, the upper edge 54 is below the first side-panel upper edge 70 and below the second side-panel upper edge 78.

Figure 6:
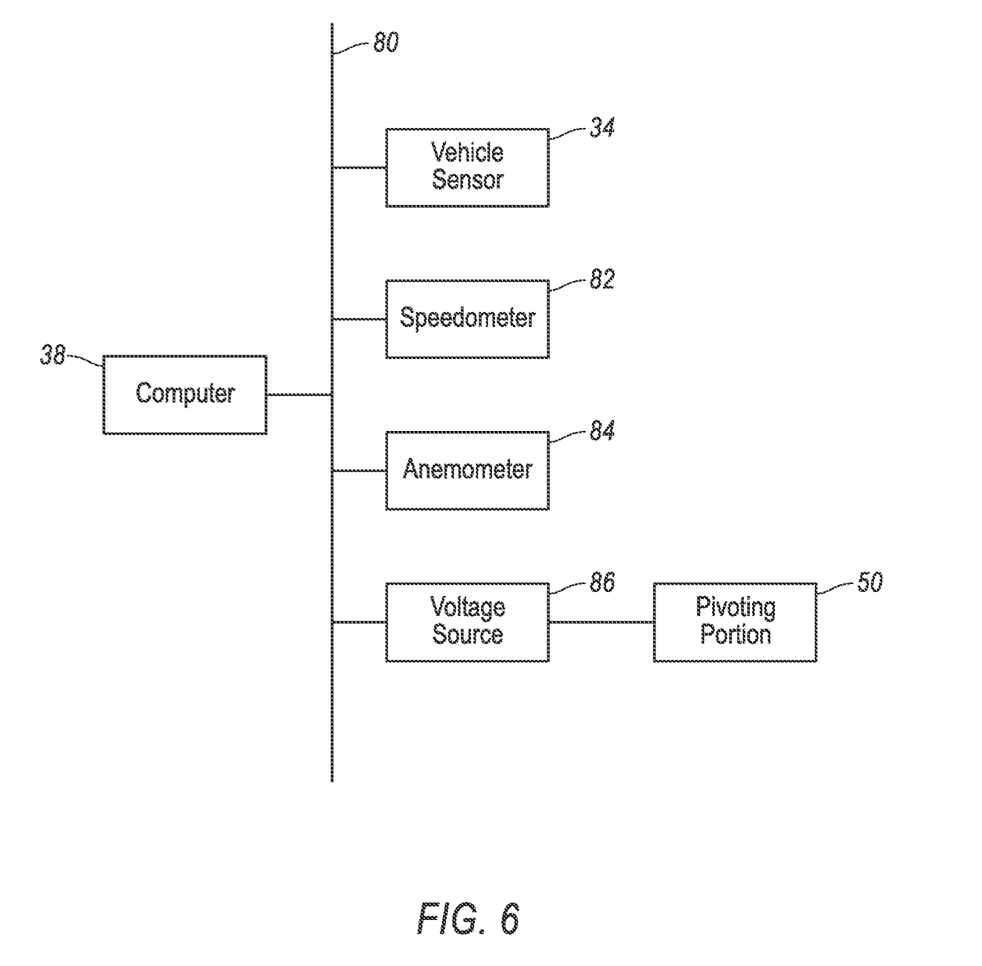
FIG. 6 is a block diagram of a control system for the sensor assembly.

With reference to FIG. 6, the computer 38 is a microprocessor-based controller. The computer 38 includes a processor, a memory, etc. The memory of the computer 38 includes media for storing instructions executable by the processor as well as for electronically storing data and/or databases.

The computer 38 may transmit and receive data through a communications network 80 such as a controller area network (CAN) bus, Ethernet, WiFi, Local Interconnect Network (LIN), onboard diagnostics connector (OBD-II), and/or by any other wired or wireless communications network. The computer 38 may be communicatively coupled to the vehicle sensor 34, a speedometer 82, an anemometer 84, a voltage source 86, and other components via the communications network 80.

The speedometer 82 may be any sensor suitable for measuring the speed of the vehicle 30, for example, as is known, a mechanical or eddy-current speedometer, or a vehicle speed sensor. A vehicle speed sensor may use a magnetic field detector to count interruptions of a magnetic field by a toothed metal disk disposed on a driveshaft of the vehicle 30.

The anemometer 84 is fixed relative to the sensor. The anemometer 84 may be any sensor suitable for measuring the speed of the window relative to the vehicle 30, for example, as is known, a pitot tube static anemometer or a fan anemometer.

The voltage source 86 is electrically connected to the pivoting portion 50 so as to apply a voltage across the pivoting portion 50. The voltage source 86 can be, e.g., a battery, a capacitor, a generator driven by an engine of the vehicle 30, etc.

Figure 7:
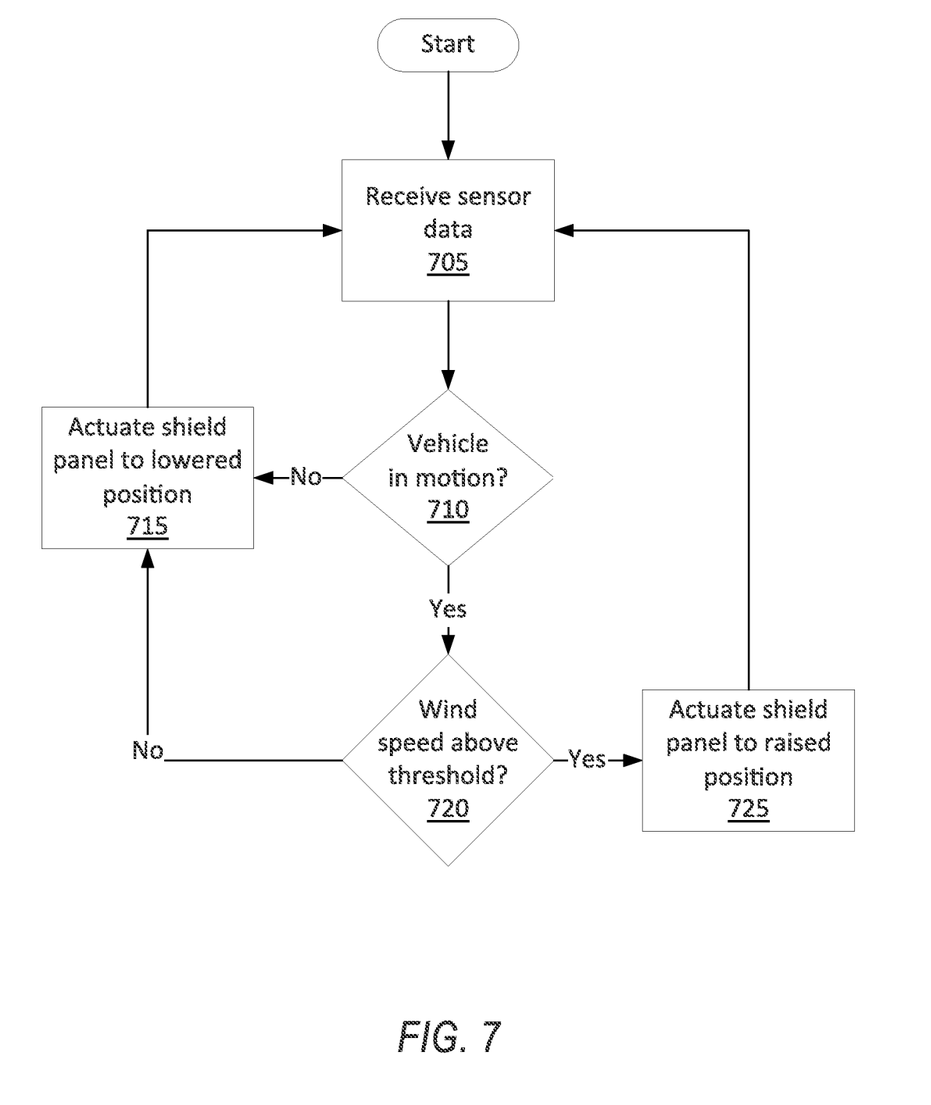
FIG. 7 is a process flow diagram of an example process for controlling the sensor assembly.

FIG. 7 is a process flow diagram illustrating an exemplary process 700 for controlling the sensor assembly 32, in particular, raising and lowering the shield panel 36. The memory of the computer 38 stores executable instructions for performing the steps of the process 700. As a general overview of the process 700, the computer 38 raises the shield panel 36 to the raised position when the vehicle 30 is in motion and the wind speed is above a threshold, and lowers the shield panel 36 to the lowered position when the vehicle 30 is stationary or the wind speed is below the threshold.

The process 700 begins in a block 705, in which the computer 38 receives data from the speedometer 82 and the anemometer 84. The data from the speedometer 82 and anemometer 84 are numerical quantities in units of velocity, e.g., miles per hour.

Next, in a decision block 710, the computer 38 determines whether the vehicle 30 is in motion or is stationary. If the data from the speedometer 82 indicates that the speed of the vehicle 30 is not equal to substantially zero, then the vehicle 30 is in motion; if the speed of the vehicle 30 is zero, then the vehicle 30 is stationary. If the vehicle 30 is stationary, the process 700 proceeds to a block 715. If the vehicle 30 is in motion, the process 700 proceeds to a decision block 720.

In the block 715, the computer 38 pivots the shield panel 36 to the lowered position by controlling the electrical voltage applied to the pivoting portion 50 by the voltage source 86. The computer 38 instructs the voltage source 86 to apply the first voltage. The first voltage is chosen to correspond to the first shape of the shape-memory material of the pivoting portion 50; thus, the first voltage causes the pivoting portion 50 to move or keep the shield panel 36 at the lowered position. If the shield panel 36 is already in the lowered position, the computer 38 maintains the same voltage applied by the voltage source 86 so that the shield panel 36 stays in the same position. After the block 715, the process 700 returns to the block 705 to continue monitoring the sensor data.

In the decision block 720, the computer 38 determines whether the wind speed is greater than a threshold. The wind speed can be a component of the wind speed in a longitudinal direction, i.e., upstream to downstream direction relative to the vehicle 30. The wind speed is a relative wind speed, i.e., relative to the vehicle 30. The relative wind speed is measured directly by the anemometer 84. Alternatively, the computer 38 can use an absolute wind speed, i.e., the wind speed relative to the ground, which is derivable from the relative wind speed. The absolute wind speed is the relative wind speed minus the speed of the vehicle 30. The threshold can be chosen to correspond to a wind speed above which the shield panel 36 in the raised position deflects airflow mostly around the vehicle sensor 34 and below which the shield panel 36 provides less benefit, as determined by experimentally counting strikes against the vehicle sensor 34 by, e.g., insects or water droplets. For example, the threshold can be 25 miles per hour. The threshold can incorporate hysteresis, i.e., different values based on whether the shield panel 36 is currently in the lowered position or the raised position. The threshold when the shield panel 36 is in the lowered position can be a baseline threshold (e.g., 25 miles per hour) plus a delta (e.g., 2 miles per hour), and the threshold when the shield panel is in the raised position can be the baseline threshold minus the delta. The delta can be chosen to prevent the shield panel 36 from switching positions too frequently, e.g., frequently enough to wear out components in less than a warranty period. If the wind speed is below the threshold, the process 700 proceeds to the block 715 to lower the shield panel 36 to the lowered position. If the wind speed is above the threshold, the process 700 proceeds to a block 725.

In the block 725, the computer 38 pivots the shield panel 36 to the raised position by controlling the electrical voltage applied to the pivoting portion 50 by the voltage source 86. The computer 38 instructs the voltage source 86 to apply the second voltage. The second voltage is chosen to correspond to the second shape of the shape-memory material of the pivoting portion 50; thus, the second voltage causes the pivoting portion 50 to move or keep the shield panel 36 at the raised position. If the shield panel 36 is already in the raised position, the computer 38 maintains the same voltage applied by the voltage source 86 so that the shield panel 36 stays in the same position. After the block 725, the process 700 returns to the block 705 to continue monitoring the sensor data.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

The disclosure has been described in an illustrative manner, and it is to be understood that the terminology which has been used is intended to be in the nature of words of description rather than of limitation. All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance or order. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A sensor assembly comprising:
   a vehicle sensor;
   a shield panel that is positioned upstream of the vehicle sensor and that is pivotable; and
   a computer communicatively coupled to the shield panel;
   wherein the computer is programmed to pivot the shield panel based on data representing a wind speed.

2. The sensor assembly of claim 1, further comprising a side panel positioned adjacent the shield panel and extending upward.

3. The sensor assembly of claim 2, wherein the side panel is stationary.

4. The sensor assembly of claim 2, wherein the side panel is a first side panel, the sensor assembly further comprising a second side panel positioned adjacent the shield panel on an opposite side as the first side panel and extending upward.

5. The sensor assembly of claim 2, wherein the shield panel includes a shield-panel edge, the side panel includes a side-panel edge, and the shield panel is pivotable to a raised position in which the shield-panel edge is aligned with the side-panel edge.

6. The sensor assembly of claim 5, wherein the side panel extends in a downstream direction from the side-panel edge.

7. The sensor assembly of claim 5, wherein the side panel is a first side panel, the side-panel edge is a first side-panel edge, the shield-panel edge is a first shield-panel edge, the sensor assembly further comprising a second side panel positioned adjacent the shield panel on an opposite side as the first side panel and extending upward, wherein the shield panel includes a second shield-panel edge, the second side panel includes a second side-panel edge, and when the shield panel is in the raised position, the second shield-panel edge is aligned with the second side-panel edge.

8. The sensor assembly of claim 7, wherein the first side panel extends in a downstream direction from the first side-panel edge, and the second side panel extends in a downstream direction from the second side-panel edge.

9. The sensor assembly of claim 1, further comprising a housing, wherein the vehicle sensor protrudes upward from the housing, and the shield panel is mounted to the housing.

10. The sensor assembly of claim 9, wherein the housing is shaped to conform to a vehicle roof.

11. The sensor assembly of claim 1, wherein the shield panel includes a panel portion and a pivoting portion, and the pivoting portion is a shape-memory material.

12. The sensor assembly of claim 11, wherein the computer pivots the shield panel by controlling electrical voltage supplied to the pivoting portion.

13. The sensor assembly of claim 1, further comprising an anemometer fixed relative to the vehicle sensor and communicatively coupled to the computer.

14. The sensor assembly of claim 1, wherein the computer is programmed to pivot the shield panel to a raised position in response to a wind speed greater than a threshold.

15. The sensor assembly of claim 1, wherein the computer is programmed to pivot the shield panel to a lowered position in response to a vehicle on which the vehicle sensor is mounted being stationary.

16. The sensor assembly of claim 1, wherein the shield panel is pivotable between a lowered position and a raised position, and the vehicle sensor extends higher than the shield panel in the raised position.

\* \* \* \* \*